April 1, 1930.  G. A. WISE  1,752,825
GUIDE FOR STRAIGHTENING ROLLS
Filed Jan. 30, 1928  5 Sheets-Sheet 1
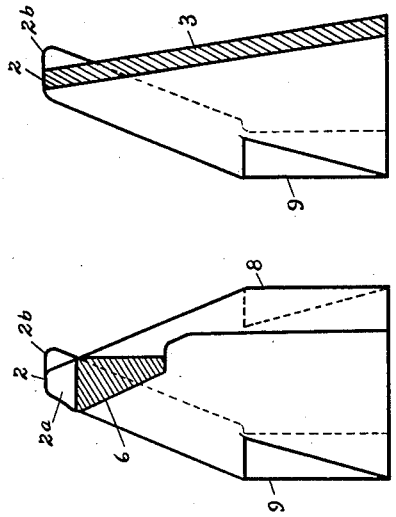
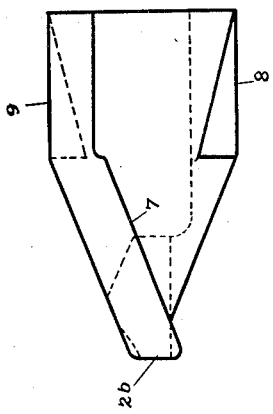
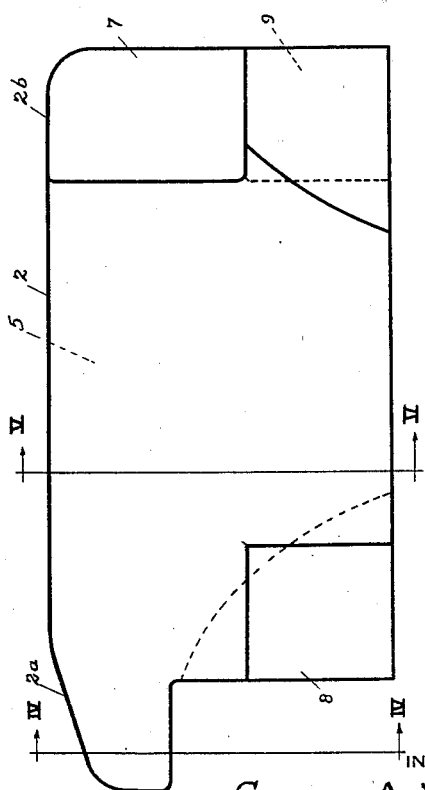
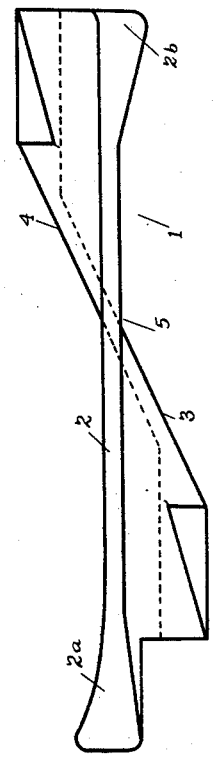
INVENTOR
George A. Wise
by William B. Wharton
his attorney April 1, 1930. G. A. WISE 1,752,825
GUIDE FOR STRAIGHTENING ROLLS
Filed Jan. 30, 1928 5 Sheets-Sheet 2
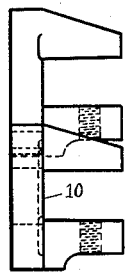
FIG. VII
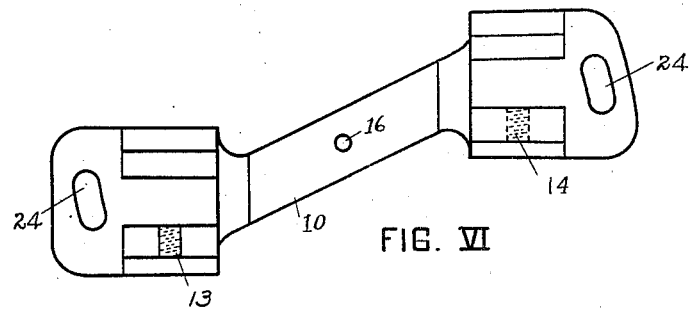
FIG. VI
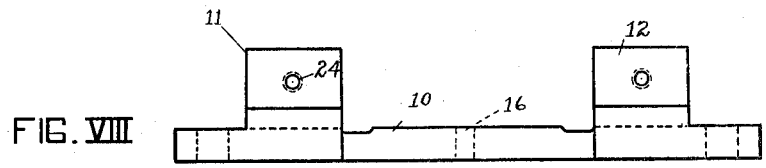
FIG. VIII
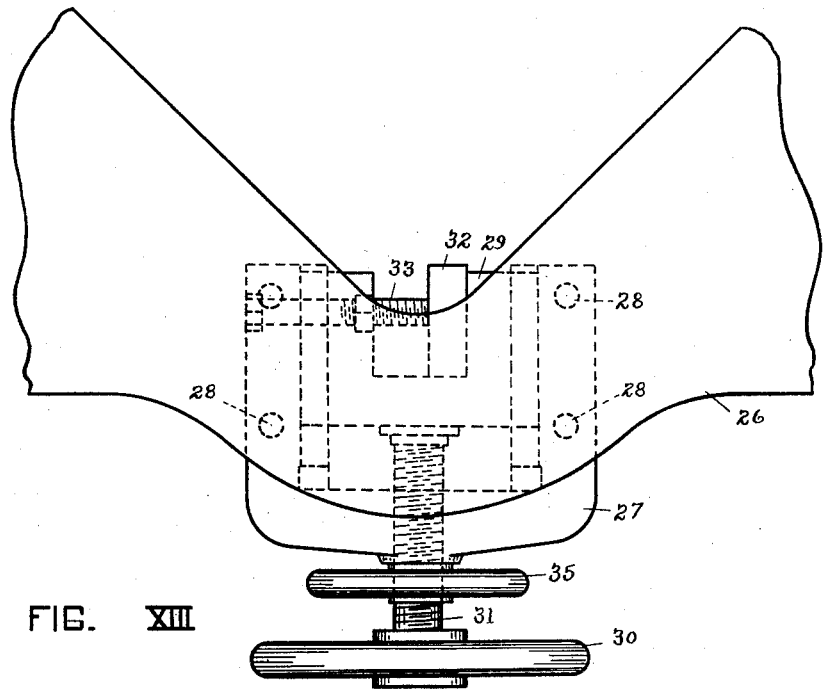
FIG. XIII
INVENTOR
George A. Wise
by William B. Wharton
his attorney

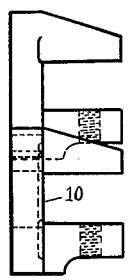
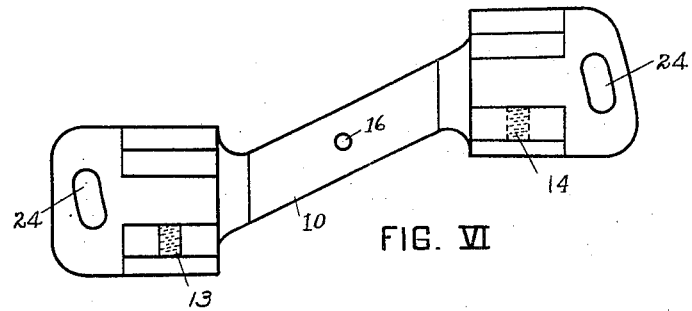
FIG. VII  FIG. VI
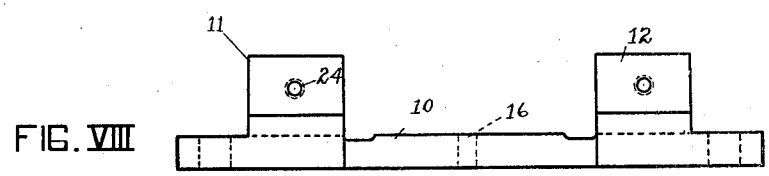
FIG. VIII
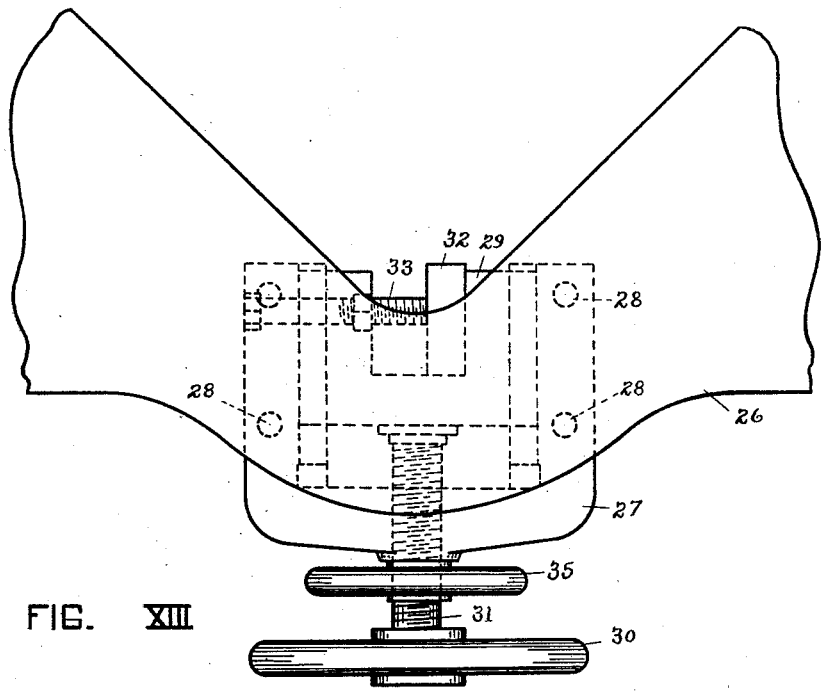
FIG. XIII

April 1, 1930.  G. A. WISE  1,752,825
GUIDE FOR STRAIGHTENING ROLLS
Filed Jan. 30, 1928  5 Sheets-Sheet 4
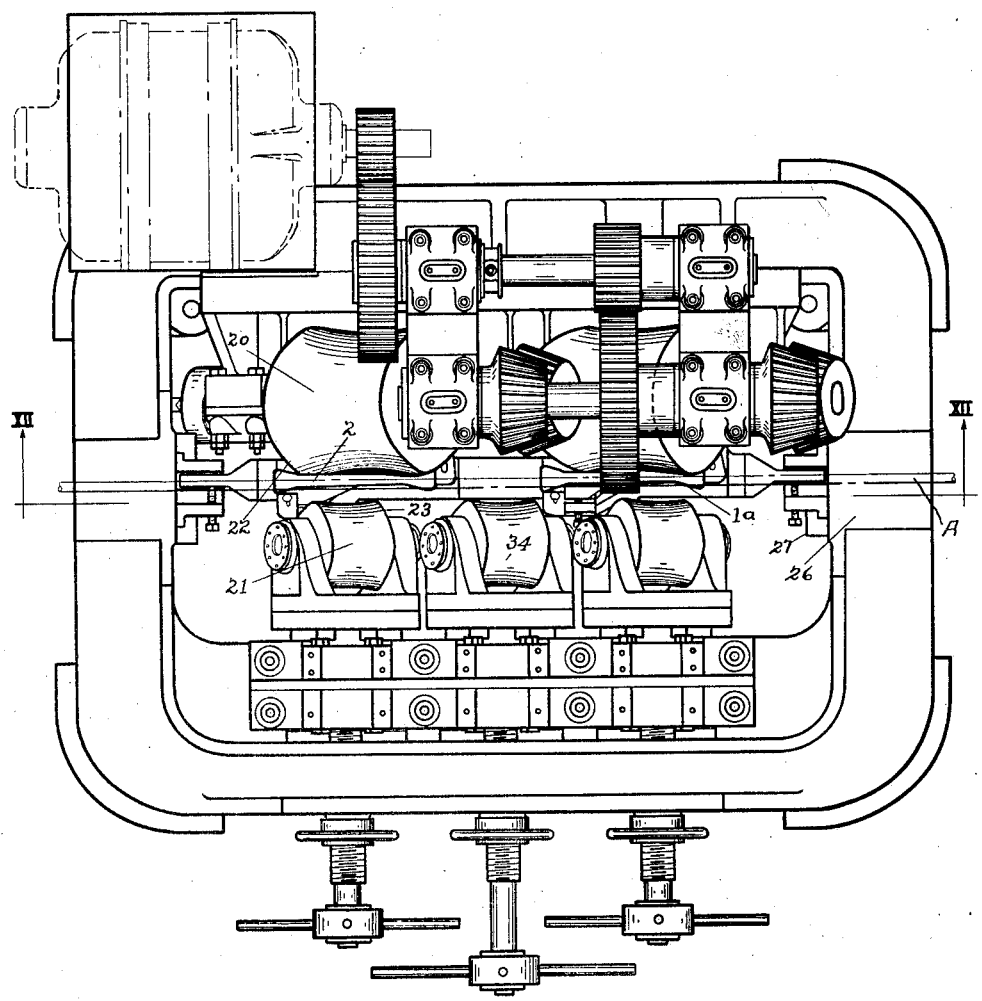
FIG. XI
INVENTOR:
George A. Wise
by William B. Wharton
his attorney April 1, 1930.   G. A. WISE   1,752,825
GUIDE FOR STRAIGHTENING ROLLS
Filed Jan. 30, 1928   5 Sheets-Sheet 5
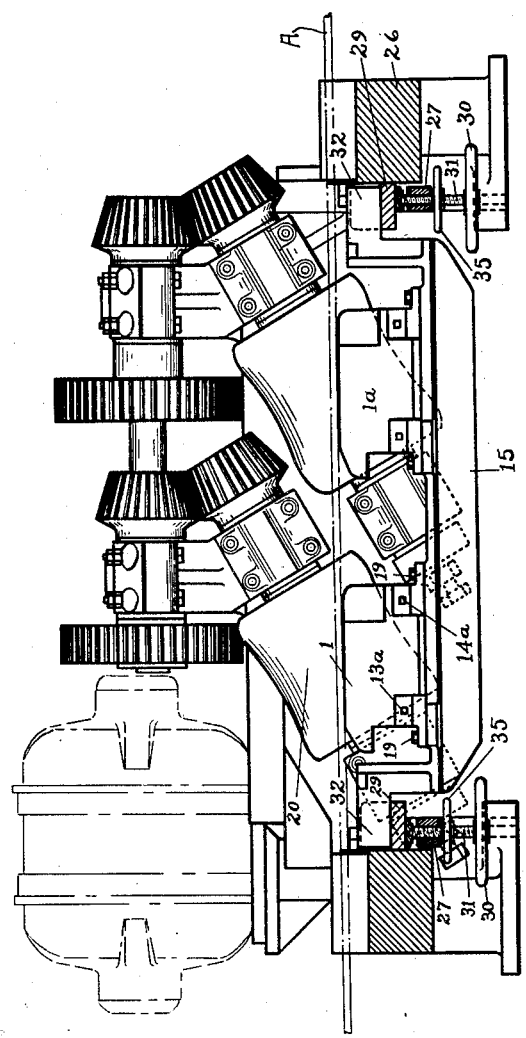
FIG. XII
INVENTOR:
George A. Wise.
by William B. Wharton
his attorney Patented Apr. 1, 1930

1,752,825

UNITED STATES PATENT OFFICE

GEORGE A. WISE, OF PITTSBURGH, PENNSYLVANIA, ASSIGNOR TO SUTTON ENGINEERING COMPANY, OF PITTSBURGH, PENNSYLVANIA, A CORPORATION OF PENNSYLVANIA

GUIDE FOR STRAIGHTENING ROLLS

Application filed January 30, 1928. Serial No. 250,375.

This invention relates to an improvement in means for guiding or supporting round stock or bars during their passage between rolls, and is particularly adapted for use in conjunction with straightening machines having contoured cross rolls.

Up to the present time, a great deal of difficulty has been experienced in rolling stock between contoured cross rolls, because there has been no adequate manner of supporting the said stock throughout its length between the rolls. The result of poor guiding is a roughly finished product. In order to prevent the stock from chattering between the rolls, and to prevent marring the surface of the stock, it is necessary to maintain the stock in a certain line of travel while the same is in contact with the rolls. It is of course obvious that the stock may be engaged by supporting means at a point outwardly from either end of a set of cross rolls, or at the mid-point between the rolls. At any of these said points a standard may be mounted on the machine bed, and extended inwardly of the rolls to guide the stock therebetween, without interfering with, or contacting, the faces of the rolls. Heretofore, this manner of guiding has been used, but has not proved entirely satisfactory because of the constant attention and adjustment that it requires.

The object of this invention is to provide a guide for supporting stock along its entire length between a set of cross rolls. More specifically, the object is to provide a rigid guiding surface which conforms with, or lies parallel to, the line of travel followed by stock passing through a set of contoured rolls.

Another object of the invention is to provide guiding means for contoured cross rolls, such means presenting a guiding surface which is continually supported in its length between the said rolls.

A further object of the invention is to provide an adjustable mounting whereby the guiding means for two or more pairs of cross rolls may be vertically adjusted in unison, and/or individually adjusted in a horizontal plane.

In the drawings Figure I is a plan view of the guide proper; Figure II is a side elevation of the same; Figure III shows an end elevation of the guide; Figures IV and V are sectional views taken on the lines IV—IV and V—V respectively as shown in Fig. II; Figures VI, VII, and VIII respectively show a plan, end view, and side elevation of the bracket in which the guide is mounted; Figure IX is a plan view of the frame to which the brackets and guides are affixed, showing the same on a reduced scale with respect to Figs. V and VI and also with respect to Figs. XIV to XVII inclusive; Figure X is a side elevation of said frame; Figure XI is a plan view of a previously known type straightening machine on which the guides and their mounting means are attached; Figure XII is a sectional view taken on the line XII—XII of Fig. XI, and illustrates to particular advantage how the device of this invention is mounted in a cross roll machine; Figure XIII is a segmental end view of the machine base, illustrating the adjustable yoke in which the guide holding frame is mounted; Figure XIV is a plan view of one of the main, or driven, rolls of a straightening machine and the guide, illustrating one vertical position of the guide; Figure XV is a side elevation of the roll and guide, illustrating the same vertical position; Figure XVI is a plan view of a main, or driven, roll and the guide, illustrating a different vertical position of the guide and the swivelling of the guide to accommodate for the change in vertical position; and Figure XVII is a side elevation of the roll and guide, illustrating the same vertical position shown in Figure XVI.

The reference numeral 1 designates the guiding member proper, and as detailed in Figures I to V inclusive, shows the form or shape of the same. The top or guiding surface 2 is straight, and except for the flared ends 2ª and 2ᵇ, is uniform in width. The guide 1 is positioned between a pair of contoured cross rolls in such a manner that the trace, or line, of the surface 2 is horizontal, and lies below the point of intersection of the center lines of the cross rolls projected into a vertical plane. That is, the surface 2 lies just below the path followed by the stock and serves to rigidly support the same in its passage between a set of cross rolls, say, 20 and 21.

It is well known in the art that the object in cross roll straightening is to secure, as nearly as practical, a line contact between the stock and the rolls. Therefore, the angle at which the rolls cross, and their distance apart must be varied for different diameters of stock being passed therebetween. With these adjustments it is possible to determine a straight path between a set of cross rolls. It is in this path that the stock A is moved, and for the above reasons it is desirable to have a straight guiding surface, such as the surface 2, to support the stock throughout its length between the cross rolls. If, however, the surface 2 is not rigid it loses most of its effect as a guide. In order to give solidity to the said guiding surface 2, it is backed by a web comprising two portions 3 and 4. It will be noticed that the web portion 3 slopes outwardly and downwardly from one side of the surface 2, and the web portion 4 slopes away from the other side of the said surface. The two web portions 3 and 4 unite, or join in a vertical plane at the mid-point 5 of the guide.

Every pair of contoured cross rolls, such as 20 and 21, have portions, such as ends 22 and 23 respectively which pass downwardly and inwardly from the path of the stock A, and in order to allow clearance for these portions of the roll the novel structure of the guide was designed. That is, the web portion 3 slopes to allow clearance for portion 22 of roll 20, and web portion 4 slopes away on the other side of surface 2 to clear the end 23 of roll 21. The widened faces $2^a$ and $2^b$ are reinforced with additional metal which recedes as shown at 6 and 7. It will be noticed that at the outer extremities of web portions 3 and 4 there are flat vertical portions 8 and 9 which are of increased thickness. Said portions 8 and 9 have sides which are parallel to the center line of the surface 2, and although offset from each other to create the necessary clearance as aforesaid, they serve as means for mounting the guide 1 in a swivel frame 10 which is detailed in Figs. VI, VII and VIII. The frame 10 is constructed with bifurcations 11 and 12 at each end to receive portions 8 and 9 of the guide. Threaded holes 13 and 14 allow set-screws $13^a$ and $14^a$ to pass therethrough and engage the sides of flat portions 8 and 9 of the guide 1. This serves to give a rigid attachment of the guide in the frame 10.

Figures IX and X show the peculiar underslung carriage 15 on which one or more guides in a frame 10 are mounted. It will be noted that the frame 10 has a centrally located hole 16 which corresponds to opening 17 in the carriage 15. The sizes of these holes apparently are not equal, as shown in Fig. VI as compared with IX and X, but this is due to the decreased scale of drawing in the latter view. A dowel or pivot pin $16^a$ passing through these holes, when the frame 10 is placed on the deck portion 18 of the carriage, serves to center the same and give a fixed point around which the guide in said frame 10 may be angularly adjusted. Cap bolts 19 pass through curved slots 24 and are in threaded engagement with the holes 25 of the carriage 15. In this manner the desired angular position of the guide relative to the carriage or rolls may be determined and the bolts 19 then tightened to retain this position.

A fragment of the frame 26 of a cross rolling machine is shown in Fig. XIII and illustrates one of the yokes 27 which is fixed to the said frame by means of the several screws 28 represented in dotted lines. There is, of course, a yoke 27 on each end of the machine. Slidably retained in the yoke 27 is a U shaped seat 29 which, by rotating the hand wheel 30 and the threaded shaft 31 integral therewith, may be raised or lowered relatively to the machine frame 26. As is seen in the sectional view, Fig. XII, the underslung carriage 15 has two extensions 32 which are positioned in the U shaped members 29 of the yokes 27. Suitable means such as a locking screw 33, (Fig. XIII) may be utilized to make fast the seating of the extensions 32 in the U seats 29. Transverse adjustment of the carriage 15 in a horizontal plane is provided by these U seats. Thus the extensions 32 may obviously be shifted in the seats, and suitable backing means such as shims inserted to permit clamping of the extensions 32 by locking screws 33.

It is usual in modern practice to have two or more pairs of cross rolls, such as 20 and 21, in a machine unit, and between the two pairs of rolls there is an idler roll 34 interposed to flex the stock in its passage from the entering pair to the leaving pair of cross rolls. As previously pointed out it is desirable to guide the stock between each pair of cross rolls. The particular form of guide $1^a$ for the leaving pair of rolls involves no material change in form over the guide 1 especially described herein. Both guides 1 and $1^a$ are mounted on the carriage 15 and each may be independently adjusted in the horizontal. Due to the fact that both guides are mounted, as aforesaid, on the common base or carriage 15 they may be vertically adjusted simultaneously as the carriage is raised or lowered by rotating one or both of the hand wheels 30. The hand wheels 35 serve as locking means to prevent the shafts 31 from moving after the same have been rotated to give the guides the proper elevation between their respective pairs of cross rolls. The simple manner of angularly adjusting the guides individually, and vertically adjusting the same in parallel is of great convenience to the operator of the straightening or rolling machine.

The swivel mounting of the guide serves to preserve substantial contact between the guide and the main, or driven, roll with which it is associated in different vertical positions of the guide. For example, Figures XIV and XV of the drawings illustrate a vertical position of the guide in which the guide is adjusted for stock of a certain diameter. The guide is therefore adjusted at a point which is below the desired line of travel of the longitudinal axis of the stock a distance equal to the radius of the stock. As shown, the vertical adjustment is for stock of such diameter that the guide is in its straight line position.

Figures XVI and XVII of the drawings show the guide lowered into a position suitable for stock of greater diameter. With both of the guides mounted on a single underslung carriage, as shown in the drawings, the hand wheels 30 are rotated; so that the guides are brought into the vertical position shown in Figures XVI and XVII. In order that the guides 1 may lie closely adjacent the face of the roll in this latter position, the guide frames 10 are swivelled on the carriage 15 by means of the slot connections 24 of the guide frames. They are then secured in adjusted position by means of cap bolts 19.

The adjustment is shown as a lowering, and corresponding swivelling of the guides. It will readily be understood that if the guide is raised, for use with stock of lesser diameter than with the vertical adjustment of Figures XIV and XV, the swivelled adjustment of the guide frame 10 will be obtained by a movement of rotation opposite in sense to that by means of which the adjustment of Figures XVI and XVII is obtained.

It is to be understood that the principles of guiding herein described may be used either on machines having a greater or lesser number of cross rolls than the machine illustrated in the accompanying drawings. The novel form and manner of mounting the guides has made possible a more accurate control of the stock between cross rolls. As a result the rolled stock is straighter and more uniform, and the surface or finish is much superior to that accomplished by the use of the similar machine tools heretofore employed.

What I claim is:

1. A guide for supporting stock between a pair of cooperating cross rolls having a guiding surface continuously supported between the cross rolls by a thin wall of metal having two portions, said portions being arranged to diverge outwardly and downwardly on opposite sides of the guiding surface, said wall portions meeting in a common vertical line at approximately the mid-point of the guiding surface and each wall portion having a vertical face at the lower and outer extremity thereof to serve as a mounting base for the guide.

2. A guide for supporting stock between a pair of cooperating cross rolls having a guiding surface continuously supported throughout its approximate length by a thin wall of metal having two portions arranged to diverge outwardly and downwardly on opposite sides of the guiding surface, said portions being each inclined longitudinally with respect to the guiding surface.

3. A guide for supporting stock between a pair of cooperating cross rolls having a guiding surface continuously supported throughout its approximate length by a thin wall of metal having two portions arranged to diverge outwardly and downwardly on opposite sides of the guiding surface, said portions being each inclined longitudinally with respect to the guiding surface, each wall portion having a vertical face at the lower and outer extremity thereof to serve as a mounting base for the guide.

4. A guide for supporting stock between a pair of cooperating cross rolls having a guiding surface continuously supported throughout its approximate length by a thin wall of metal having two portions arranged to diverge outwardly and downwardly on opposite sides of the surface, said wall portions meeting in a common vertical line at approximately the mid-point of the guiding surface.

5. A guide for supporting stock between a pair of cooperating cross rolls having a guiding surface continuously supported throughout its approximate length between the cross rolls, said guiding surface having areas of increased width adjacent its ends.

6. A guide for supporting stock between a pair of cooperating cross rolls having a guiding surface continuously supported throughout its approximate length by a web of metal between the cross rolls, said guiding surface having areas of increased width adjacent its ends.

7. A guide for supporting stock between a pair of cooperating cross rolls having a guiding surface with areas of increased width adjacent its ends and continuously supported throughout its approximate length by a thin wall of metal, said wall of metal having two portions arranged to diverge outwardly and downwardly on opposite sides of the guiding surface, said portions being each inclined longitudinally with respect to the guiding surface.

8. A guide for supporting stock between a pair of cooperating cross rolls having a guiding surface with areas of increased width adjacent its ends and continuously supported throughout its approximate length by a thin wall of metal arranged to diverge outwardly and downwardly on opposite sides of the guiding surface, the wall on each side of the guiding surface being inclined longitudinally with respect to the guiding surface, each side portion of said wall having a vertical face at the lower and outer extremity thereof to serve as a mounting base for the guide.

9. A guide for supporting stock between a pair of cooperating cross rolls having a guiding surface of increased width adjacent its ends and continuously supported throughout its approximate length by a thin wall of metal having two portions arranged to diverge outwardly and downwardly on opposite sides of the guiding surface, said wall portions meeting in a common vertical line at approximately the mid-point of the guiding surface.

10. In a guide structure for supporting stock between cooperating cross rolls, the combination of a guide having a guiding surface supported continuously throughout its approximate length by a web arranged to diverge outwardly and downwardly from either side of the guiding surface, the web on each side of the guiding surface being inclined longitudinally with respect to the guiding surface, faces at the lower edge of said web to serve as seating bases for the guide, a guide retaining frame, and means for fixing the guide in the guide retaining frame.

11. In a guide structure for supporting stock between cooperating cross rolls, the combination of a guide having a guiding surface supported continuously throughout its approximate length by a web arranged to diverge outwardly and downwardly from either side of the guiding surface, faces at the lower edge of said web to serve as seating bases for the guide, a guide retaining frame, an underslung carriage, means for mounting the guide retaining frame with the guide in said carriage, and means for adjusting the carriage vertically.

12. In a guide structure for supporting stock between cooperating cross rolls the combination of a guide having a guiding surface supported continuously throughout its approximate length by a web arranged to diverge outwardly and downwardly from either side of the guiding surface, faces at the lower edge of said web to serve as seating bases for the guide, a guide retaining frame having bifurcations to engage said faces on the web, and adjustable mounting means for the guide retaining frame.

13. In a guide structure for supporting stock between cooperating cross rolls the combination of a guide having a guiding surface supported continuously throughout its approximate length by a web arranged to diverge outwardly and downwardly from either side of the guiding surface, an underslung carriage, means for producing vertical adjustment of said carriage, a guide retaining frame arranged to engage said guide, and means for mounting said guide retaining frame for angular adjustment in said carriage.

14. In a guide structure for supporting stock between cooperating cross rolls the combination of a guide having a guiding surface supported continuously throughout its approximate length by a thin wall of metal having two portions diverging outwardly and downwardly on opposite sides of the guiding surface, and a retaining frame for the guide comprising two mutually offset end members having means for engaging the lower edges of the two wall portions and a connecting portion for said end portions.

15. In a guide structure for supporting stock between cooperating cross rolls the combination of a guide having a guiding surface supported continuously throughout its approximate length by a thin wall of metal having two portions diverging outwardly and downwardly on opposite sides of the guiding surface, a retaining frame for the guide comprising two mutually offset end members having means for engaging the lower edges of the two wall portions, an underslung carriage, and means for mounting the retaining frame for angular adjustment in said carriage.

16. In a guide structure for supporting stock between cooperating cross rolls the combination of a guide having a guiding surface supported throughout its approximate length by a thin wall of metal having two portions diverging outwardly and downwardly on opposite sides of the guiding surface, a retaining frame for the guide comprising two mutually offset end members having means for engaging the lower edges of the two wall portions, and vertically adjustable supporting means for said guide retaining frame.

17. In a guide structure for supporting stock between cooperating cross rolls the combination of a guide having a guiding surface supported throughout its approximate length by a thin wall of metal having two portions diverging outwardly and downwardly on opposite sides of the guiding surface, a retaining frame for the guide comprising two mutually offset end members having means for engaging the lower edges of the two wall portions, and vertically adjustable supporting means for the guide retaining frame, the guide retaining frame being mounted for angular adjustment on said vertically adjustable supporting means.

18. In a guide structure for supporting stock between cooperating cross rolls the combination of a guide having an upper stock contacting member and supporting means for said member, a vertically adjustable carriage, a guide retaining frame arranged to engage said guide, and means for mounting said guide retaining frame for angular adjustment in said carriage.

19. In a guide structure the combination of a guide having an upper stock contacting member and supporting means for said member, a carriage mounted for vertical and horizontal adjustment, and means for mounting the guide on said carriage for angular adjustment relatively thereto.

20. In a guide structure the combination of a guide having an upper stock contacting member and supporting means for said member, and vertically adjustable base member, said guide supporting means and said guide being angularly adjustable in said base member.

21. A guide for supporting stock between a pair of cooperating cross rolls having a guiding surface continuously supported throughout its length by a thin wall of metal having two portions arranged to diverge outwardly and downwardly on opposite sides of the surface, said wall portions meeting in a common vertical line.

22. A guide for supporting stock between a pair of cooperating cross rolls having a guiding surface supported substantially throughout its length between the said cross rolls by a web of metal having two portions, one of said portions extending angularly downwardly and outwardly from one side of the guiding surface the outward extent of said web portion increasing toward one end of said guiding surface, and the other of said web portions extending angularly downwardly and outwardly from the other side of said guiding surface the outward extent of the latter web portion increasing toward the end of the guiding surface opposite that end toward which the outward extent of the other web portion increases.

In witness whereof, I hereunto set my hand.

GEORGE A. WISE.